United States Patent [19]

Kuo et al.

[11] Patent Number: 5,242,589
[45] Date of Patent: Sep. 7, 1993

[54] FILTER THAT CHANGES THE DIRECTION OF WATER CURRENT ARBITRARILY

[75] Inventors: Long-Far Kuo; Cheng-Wei Hsu, No. 58, Chian-Chan St., Shu-Lin Chian, both of Taipei, Taiwan

[73] Assignee: Cheng-Wei Hsu, Taipei, Taiwan; a part interest

[21] Appl. No.: 808,480

[22] Filed: Dec. 16, 1991

[51] Int. Cl.⁵ ............................................. B01D 29/58
[52] U.S. Cl. .................................. 210/264; 210/283; 210/288
[58] Field of Search ............... 210/264, 266, 283, 288, 210/443

[56] References Cited

U.S. PATENT DOCUMENTS

| | | | |
|---|---|---|---|
| 3,554,377 | 1/1971 | Miller | 210/283 |
| 4,196,081 | 4/1980 | Pavia | 210/283 |
| 4,383,920 | 5/1983 | Muller et al. | 210/284 |

*Primary Examiner*—Ivars Cintins
*Attorney, Agent, or Firm*—Harrison & Egbert

[57] ABSTRACT

The main feature of this invention is a water filter, made up of a top cover, multiple layers of filtration containers (with net board at the bottom of each container) piled up unit by unit, an axle double-deck sleeve (with vents made on edges of the sleeve linking to one of the middle filtration containers) set in the middle to link all of the filtration containers and a pedestal, installed under all the other units, that has a control valve with five square vents to allow the control the direction of water current, to go from the water inlet to internal sleeve and top cover, spread out and flow down from all layers of filtration containers, and the exhausted from the water outlet, after accumulation in the pedestal, to perform a direct filtration. The control valve can also be adjusted to make the water current to come in through the water inlet, go up to the middle filtration container through the external sleeve, spring up to the top filtration container, accumulate in the internal sleeve and flow down to the water outlet to perform a semi-reverse washing. The other feature of this water filter is the function of performing reverse operation of the water current.

13 Claims, 8 Drawing Sheets

FILTER THAT CHANGES THE DIRECTION OF WATER CURRENT ARBITRARILY

BACKGROUND OF THE INVENTION

Ever since water filters were researched, developed and widely used unceasingly, most of them still use a single and replaceable filtration core, which is an integrated unit composed of different filtration materials. Although traditional water filter requires only the change of a new filtration core and the cleaning of the container where the filtration core is put, its short filtration distance makes the process of filtration insufficient. Besides, filtration materials with longer life-spans must be replaced at the same time when those of shorter life-spans, all of them in the same unit, are damaged and must be replaced, thus causing a waste of energy resources and money. As a result, water filters with the so-called "layer-piling" structure is introduced to avoid unnecessary waste.

SUMMARY OF THE INVENTION

Inside the water filter mentioned in this case, there are two layers of sleeves which can be piled up arbitrarily and separately. The water can be guided by an internal sleeve to the top layer of a container, and a 5-direction control valve installed on a pedestal of water filter can guide the water to go from the top layer of the container to the bottom layer for filtration, or the other way round for reverse washing. The water filter can also supply water from the middle layer for reverse washing to upper layers, making the most of the water's impact to perform reverse washing in right places, which is called semi-reverse washing. If floating filtration materials are used, the direction of filtration is totally reversed, and the direction of the water can also be adjusted by the 5-direction control valve.

In short, the main feature of this invention is that the water filter can change the direction of water arbitrarily, and that its container uses a double-sleeve structure that coordinates with a 5-direction control valve in the pedestal to provide different directions of filtration for different water filters. The components of all containers are joined together through the double-sleeve structure, forming a double-layer conducting sleeve. The bottom layer of the sleeve links to the top layer of the water filter, and the other layer of the sleeve guides the water to go from the bottom layer to any appointed layer of filtration layers in the middle of water filter. By the use of a control valve, the direction of water can be changed arbitarily, which is the main purpose of this invention, according to different filtration materials.

When an ordinary precipitating filter is used, the water in the filter spreads out downward from the top layer, after passing through a water inlet, going through each filtration layers and being exhausted from a water outlet in the bottom layer of the filter. The water that goes through each filtration layers down to the water outlet in the bottom layer performs a whole-course downward filtration. As for a floating filter, the direction of water can be adjusted to go upward from its bottom layer, passing through each filtration layers, to the top layer where the water accumulates, flows downward, and goes out from the water outlet, forming a whole-course upward filtration. This process can also be the whole-course reverse cleaning process of a precipitating filter.

The other purpose of this invention is to provide a water filter that can arbitrarily change the direction of the water for segmentary filtration and reverse washing. When an ordinary precipitating filter is used, the water flows in from the water inlet, goes up through the external sleeve, flows into any one of the middle layers, flows upward to go through upper filtration layers, accumulates on the top layer, flows down through the internal sleeve, and drains out from the water outlet, forming a semi-reverse washing in segmentary upper layers. The same process forms the segmentary filtration in floating filters. When a floating filter is used, the water coming from the water inlet flows through one of the set middle layers, goes down through lower filtration layers to the bottom layer of the filter, and drains out from the water outlet, forming a segmentary semi-reverse washing in lower filtration layers in this type of filter, or a segmentary semi-filtration in a precipitating filter.

Through the operation of the control valve, the water coming in from the water inlet can also be guided directly to the water outlet, without going through filtration, segmentary filtration or reverse washing in upper filtration layers, or segmentary filtration or reverse washing in lower filtration layers.

BRIEF DESCRIPTION OF THE DRAWINGS

The following drawings are attached to present the invention clearly for a better understanding of the Investigation Committee on the structure and operation of this invention.

NOMENCLATURE

| | |
|---|---|
| (1) Top Cover | (2) Upper Net Board |
| (3) Containers | (31) Internal Sleeve |
| (32) External Sleeve | (33) Vent |
| (34) Containers for Filtration Materials | |
| (35) Net Board | (3a) Top Container |
| (3b) Middle Container | (3c) Bottom Container |
| (4) Pedestal | (5) Control Valve |
| (6) Valve Jar | (7) Valve Post |
| (71, 72) Seal Rings | (8) Seal |
| (81) Axle Hole | (9) Turning Knob |
| (A, B, C, D and E) Square Vents | |
| (I, II and III) Current Passages | |

DETAILED DESCRIPTION OF THE PREFERRED EMBODIMENT

Figure 1:
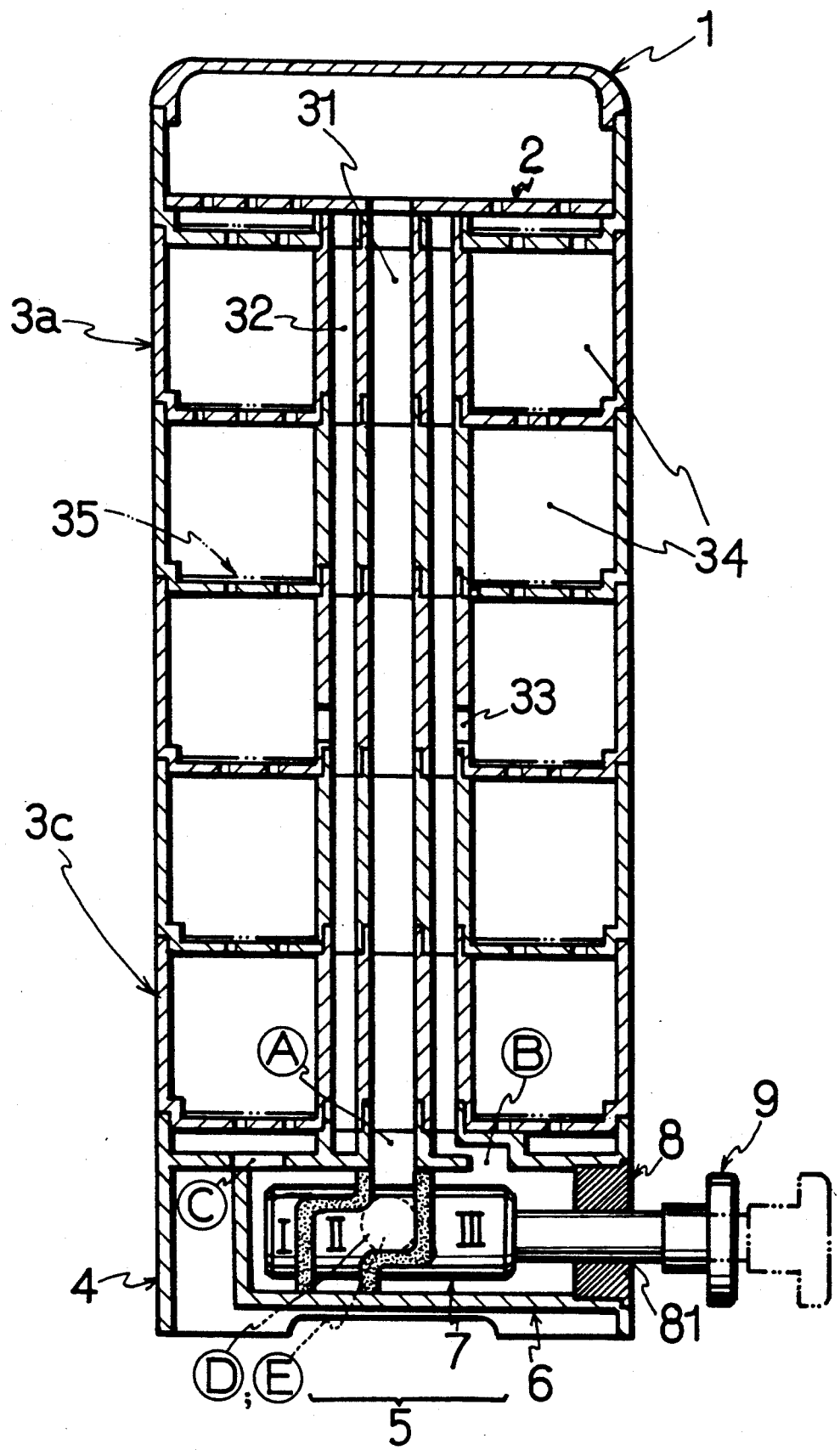
FIG. 1 shows the cross-sectional view on the structure of this invention.

The structure of water passages for semi-reverse washing or semi-filtration is installed inside the filter. The containers of the filter are divided into segmentary passages, with some of them used as detained areas. As shown by FIG. 1, a cross-sectional view of this invention, the parts from top to bottom are (1) top cover, (2) upper net board, (3) container, (4) pedestal, (6) valve jar in the pedestal, (7) valve post (8) seal and (9) turninf knob, The containers (3) are connected and piled up to be a pillar-shaped structure which has external and internal sleeves on the same axis (31, 32). The internal sleeve (31) stretches out, from one of the square vents (A) of a valve (5) in the pedestal, to the top. The external sleeve (32) stretches from square vent (B), and is connected to a top container (3a). The top part of the external sleeve is blocked by an upper net board (2), but has vents (33) in one of the middle layers to link it with the top container. The base of each containers is made of net board (35) that has holes designed according to the size of filtration materials. Net boards with holes of appropriate size can also be paved to support the filtration materials and allow the water to pass through. The top container (3a) is covered with a top cover (1), while the bottom container (3c) is mounted on a pedestal (4), forming a complete tube-shaped filter.

Figure 2:
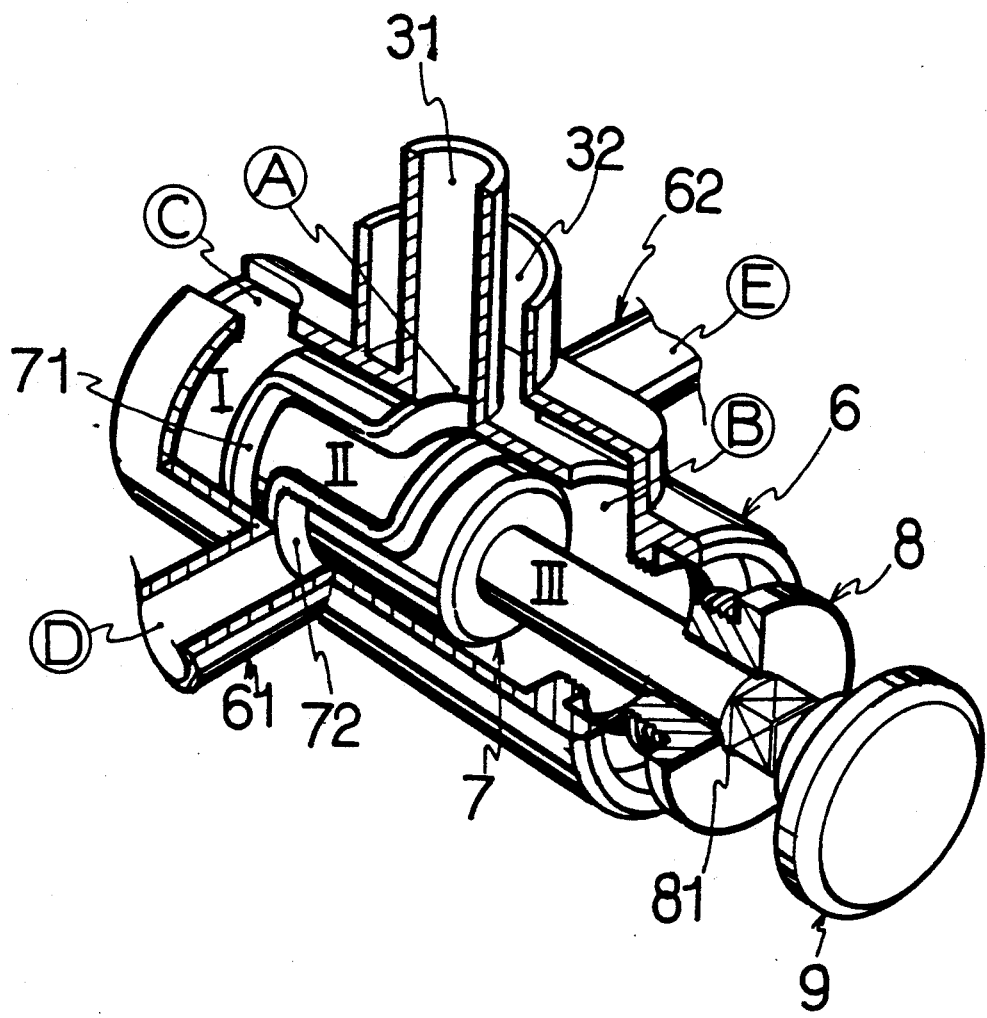
FIG. 2 is a 3-dimensional perspective drawing for part of the control valve used by this invention.

A horizontal valve jar (5) is set in the pedestal. There are three square vents made on top of the valve jar. Square vent (A) is connected with the internal sleeve (31), square vent (B) is connected with the external sleeve (32), and square vent (c) is connected with containers for filtration materials (34). Two more square vents are installed on opposite sides of the valve jar (6). Square vent (D) is the water inlet, while square vent (E) is the water outlet. Inside the valve jar (6) is a valve post (7) that has a pair of parallel S-shape seal rings (71, 72), forming current passages (I, II, III). The opening of the valve jar can be locked by a seal (8) that has an axle hole (81) in it. One end of the valve post (7) penetrates through the axle hole (81), and the other end of the valve post is connected with a turning button (9) for control of the valve jar. Please refer to FIG. 2 for the structures of the valve jar and the valve post.

Figure 3:
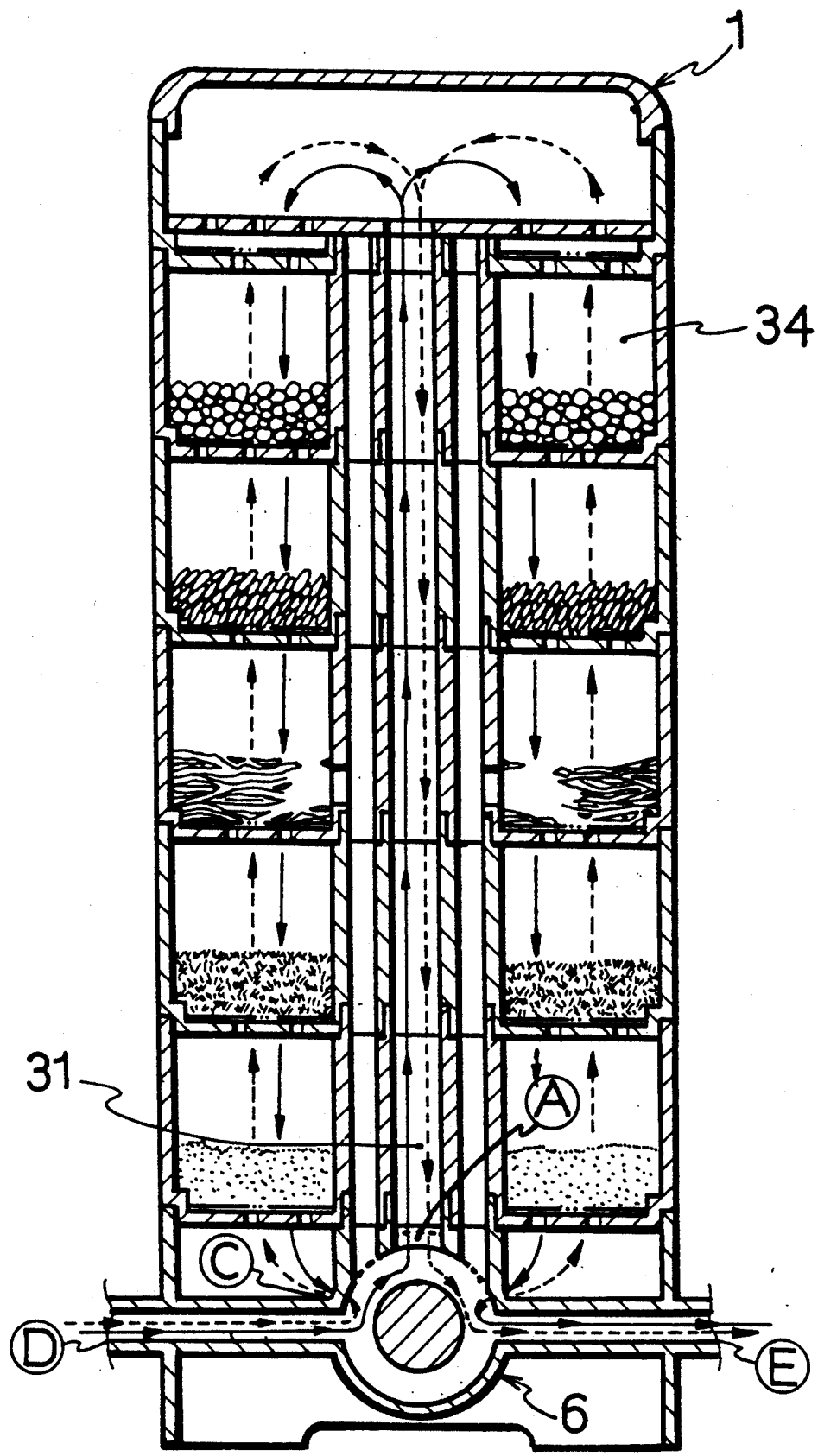
FIG. 3 illustrates water currents (1) and (2) inside this invention.
Figure 4:
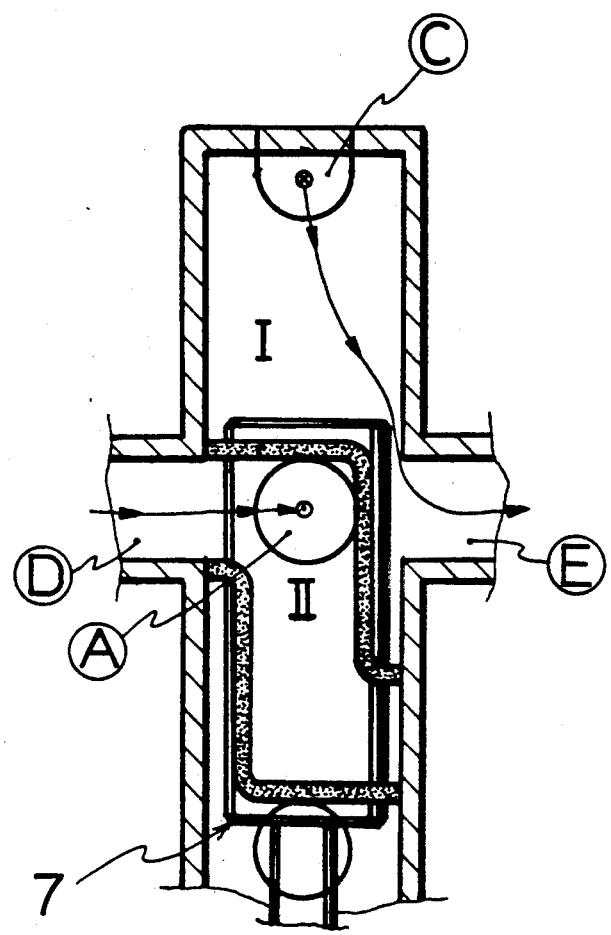
FIG. 4 illustrates the condition of the control valve for water current (1) inside this invention.
Figure 5:
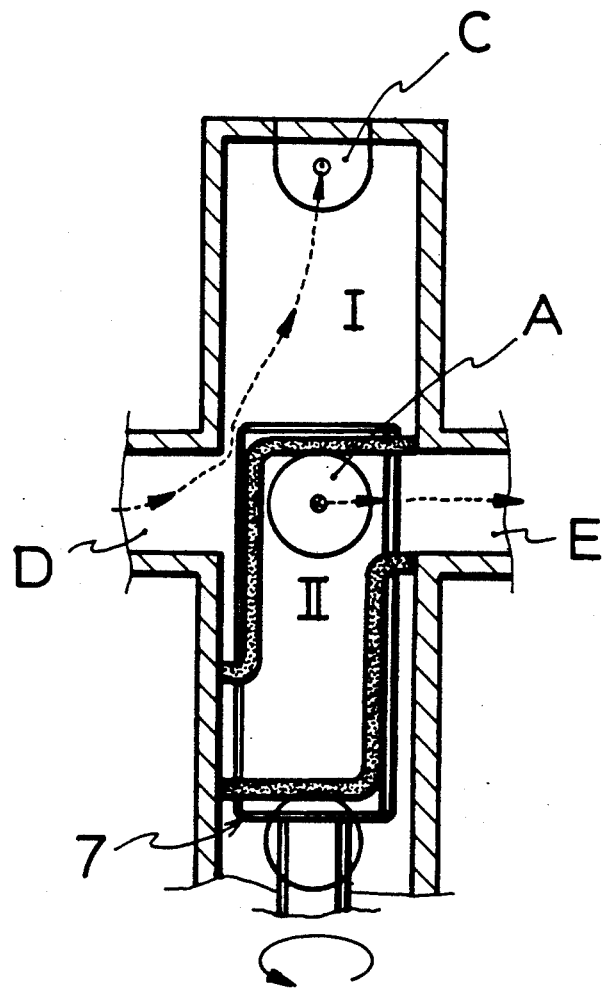
FIG. 5 illustrates the condition of the control valve for water current (2) inside this invention.

When the filter composed of these parts is set to the mode of downward whole-course filtration (as shown by FIGS. 3 and 4, in which the direction of water is indicated by a solid line), the water entering the valve jar (6) through the square vent (D) is guided by the passage (II) to go through the square vent (A), flows through the internal sleeve (31) to the top container (3a), spreads out to all containers of the filter (34), flows down to the pedestal (4), and goes out from the square vent (C) via the passage (I) to the square vent (E), from where the water is exhausted. If the filter is set to the mode of upward whole-course filtration (as shown by FIG. 3, in which the direction of water is indicated by the dotted line, and FIG. 5), turn the valve post (7) 180 degrees reversely to let the water flow in via the passage (I) to the square vent (C), and into the containers of filters (34). After the water goes up to the top cover (1) and accumulates in the internal sleeve (31), it flows down through the passage (II) through the square vent (A), processing to the square vent (E) where it is exhausted. These two methods of filtration can be used to performs whole-course reverse washing.

Figure 6:
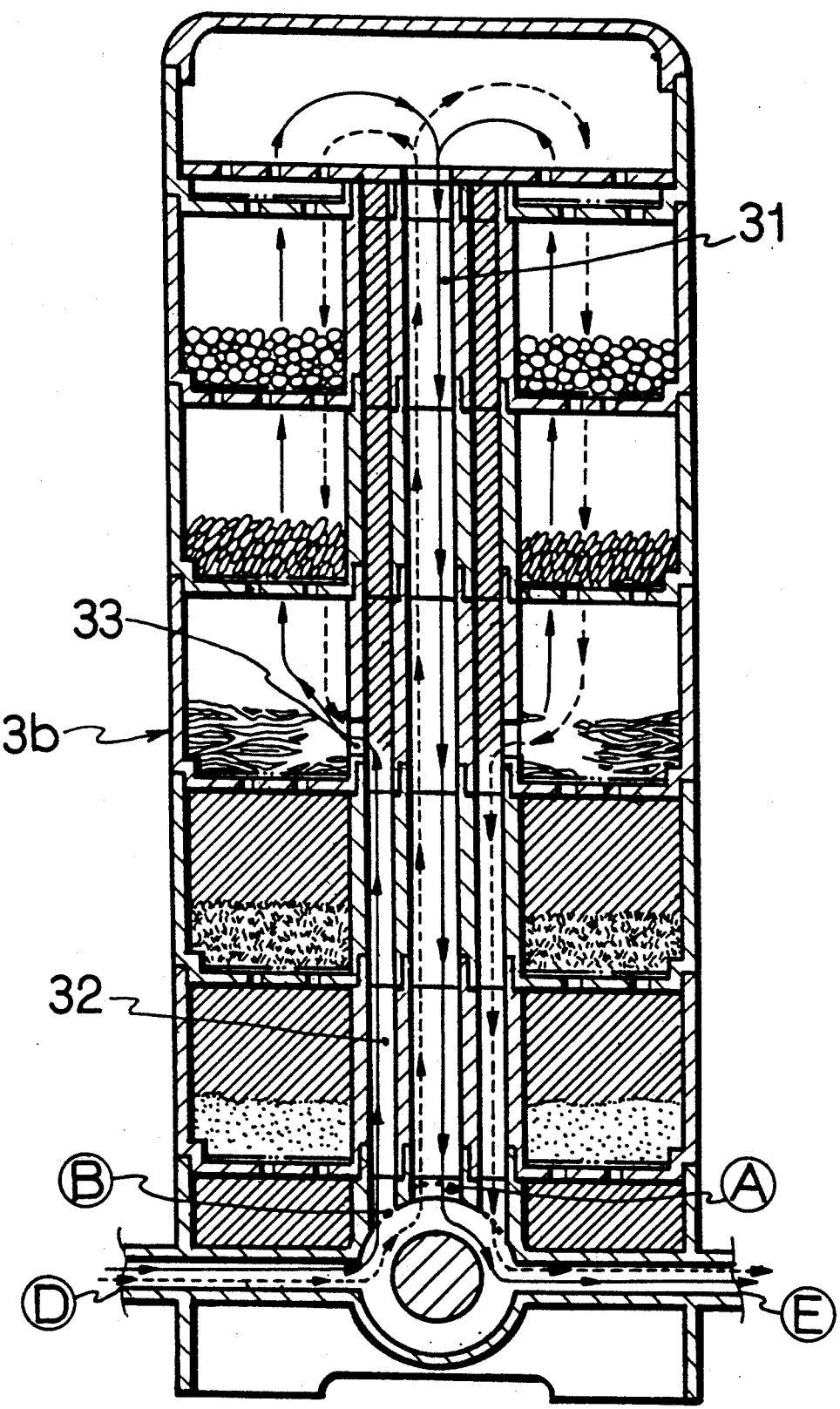
FIG. 6 illustrates water currents (3) and (4) inside this invention.
Figure 7:
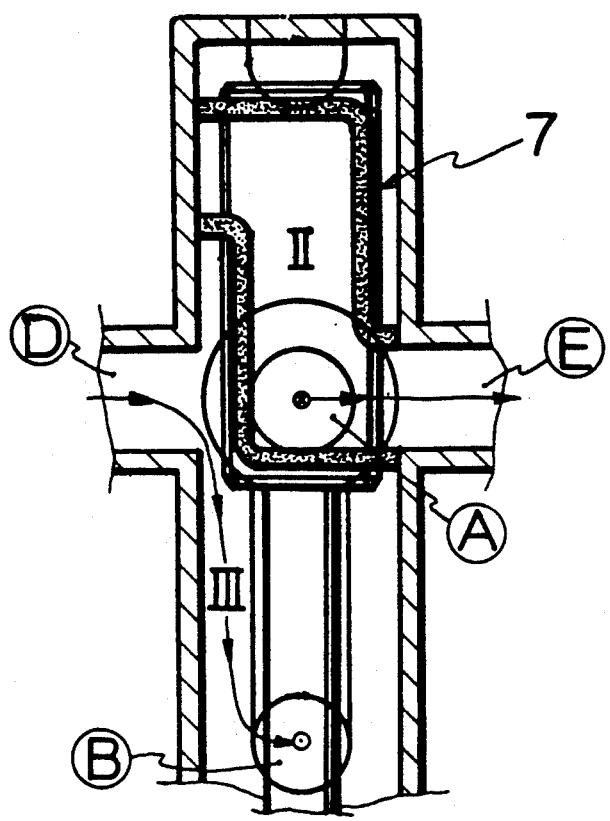
FIG. 7 illustrates the condition of the control valve for water current (3) inside this invention.

As dirt and dust are usually blocked completely in the top one or two filtration layers, the use of segmentary reverse washing for the top two or three filtration layers will make the most of the water's impact. As a result, this invention can provide the special function of segmentary reverse washing, as shown by FIG. 6 (the water current is marked as solid line with arrows) and FIG. 7. When the valve post (7) is pushed in deepest, the water flows in from the square vent (D), moves to the square vent (B) via the passage (III), goes into the container of the middle filtration layer (3b) through the vents (33) of the external sleeve (32), moves up to the top cover (1), accumulates in the internal sleeve (31), and leaves the filter from the square vent (E) after passing through the square vent (A) and the passage (II). In this half-course reverse washing process, the water in all filtration containers under the middle container (3b) with vents (33) remains still. As the square vent (C) is blocked, filtration containers (the shaded part) remain still as a result.

Figure 8:
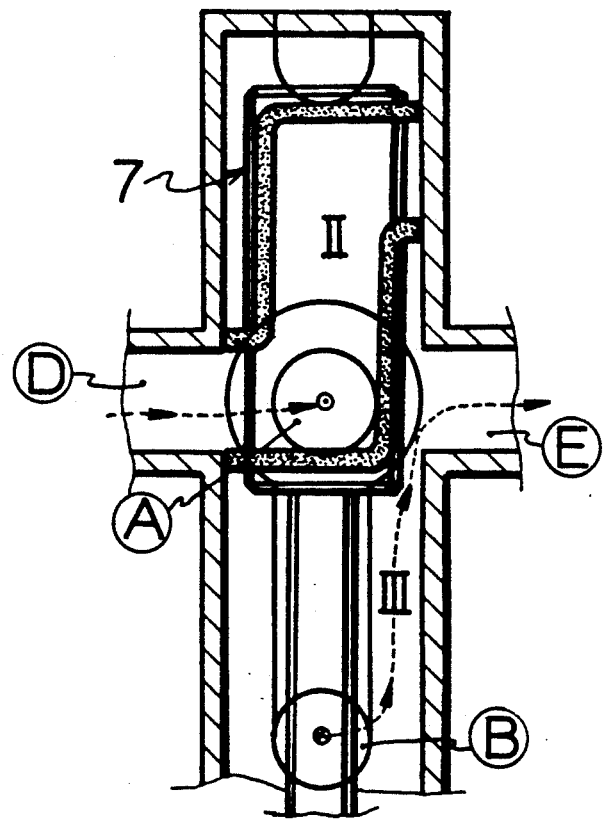
FIG. 8 illustrates the condition of the control valve for water current (4) inside this invention.
Figure 9:
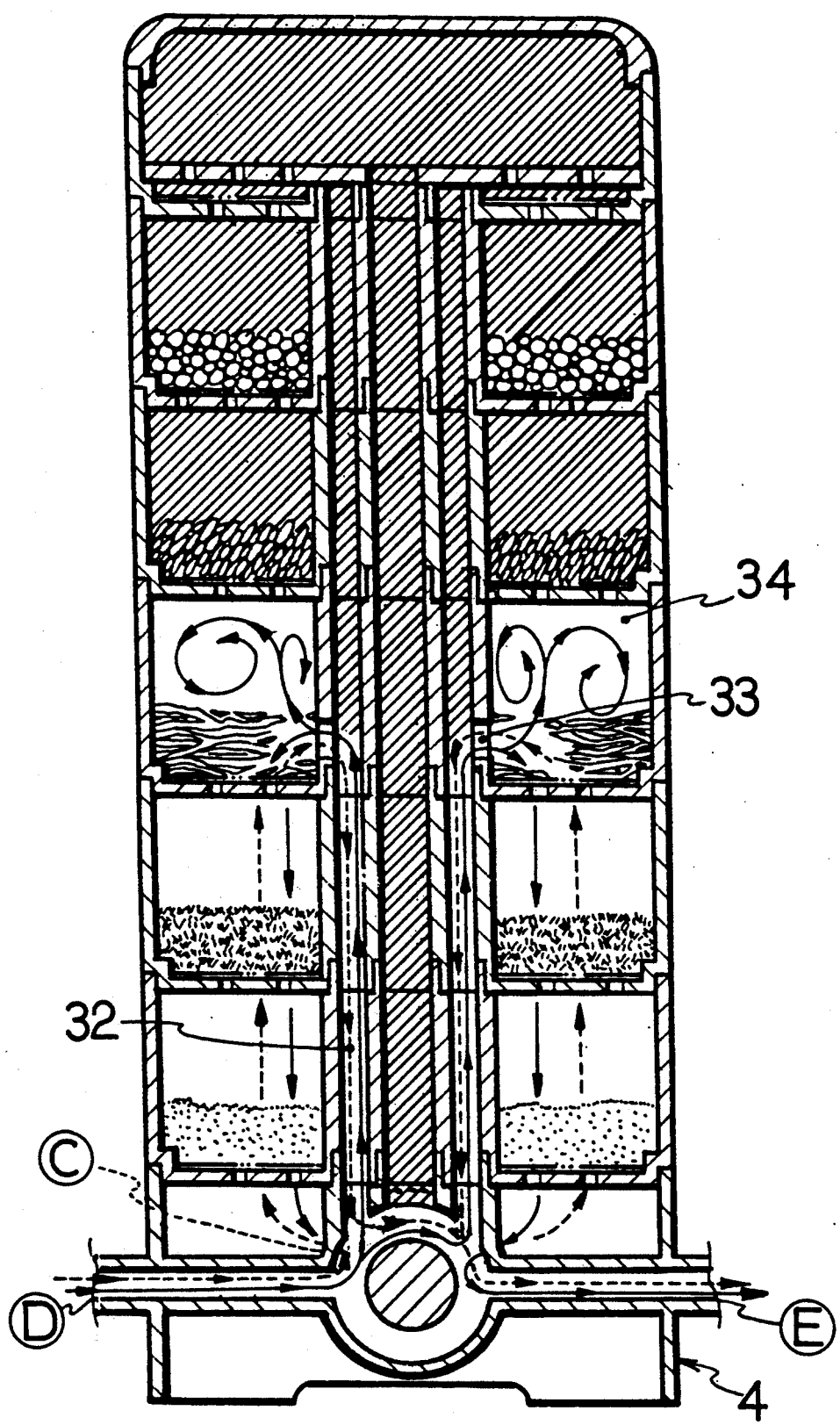
FIG. 9 illustrates water currents (5) and (6) inside this invention.
Figure 10:
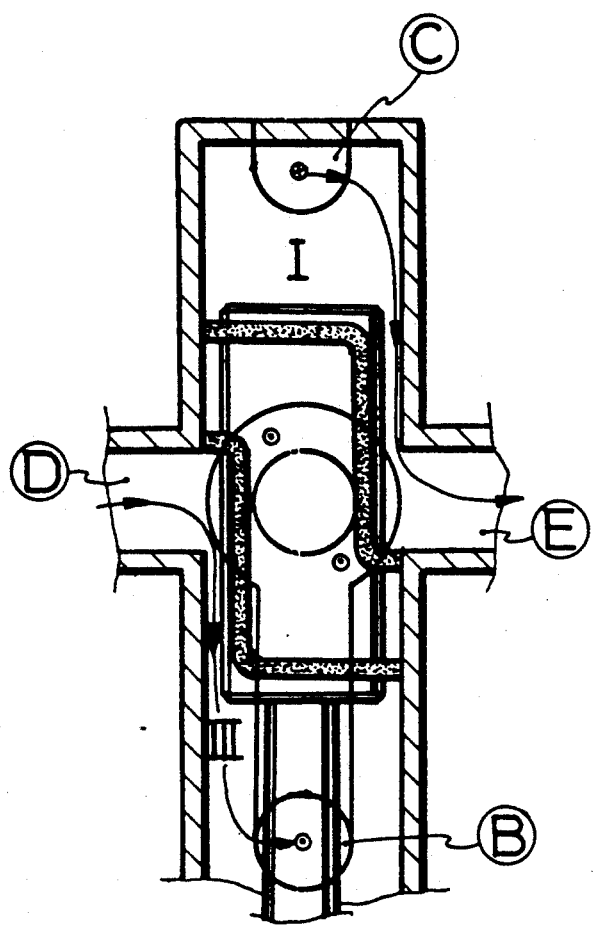
FIG. 10 illustrates the condition of the control valve for water current (5) inside this invention.
Figure 11:
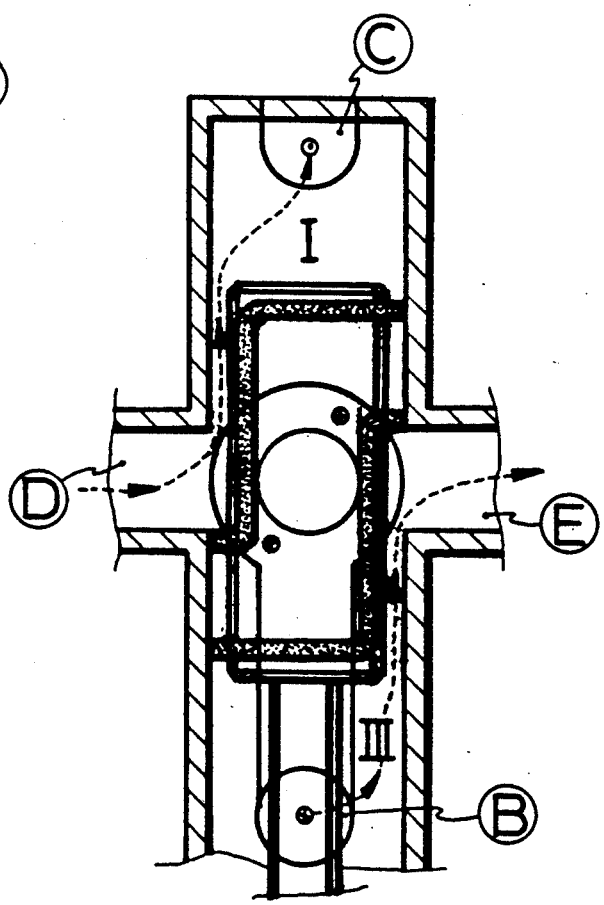
FIG. 11 illustrates the condition of the control valve for water current (6) inside this invention.

As shown by FIGS. 9 and 10, when the valve post (7) is pulled half-way out, the water goes from the square vent (D) to the square vent (B) via the passage (III), moves up along the external sleeve (32) to the container for filtration materials (34) via the vents (33), flows down to the square vent (C) of the pedestal (4), and leaves the filter from the square vent (E) through the passage (I). The shaded areas are the detained areas. If a half-course filtration is required, its direction can be controlled by the valve post (7), as shown by FIGS. 8 and 11, to perform half-course filtration or reverse washing.

The water filter provided by this invention performs the following functions: 1. To maintain a fixed location of the water inlet and outlet. 2. To change the flow of water, through the adjustment of valve post by moving the turning knobs, to suit different filtration materials. If necessary (when there is plenty of dirt on typhoon day), the dirt can be swept away by reverse washing or segmentary reverse washing to keep the water clean. 3. It is very convenient to assemble the parts.

As to the structure of the invention, its internal and external sleeves suit well the assembly of filtration containers unit by unit. When these sleeves are piled up, they form two water passages automatically, and different passages can be made for the water by using the control valve with five square vents, especially the formation of detained areas that achieve the function of half-course filtration or reverse washing.

This invention provides the most economical and simple structure for a filter to control different water currents, and offers convenience in assembly.

We claim:

1. A water filter comprising:
    a housing;
    a water inlet;
    a water outlet;
    a plurality of containers of filter material arranged in stacked relationship within said housing, each of said containers having openings for communicating with adjacent containers, said housing being sealed so as to contain water therewithin;
    a plurality of passageways interconnected to said plurality of containers within said housing, said plurality of passageways for transmitting water to and from said containers; and
    a valving means interconnected between said water outlet, said water inlet, and said plurality of passageways, said valving means for selectively routing a water flow from said water inlet to at least one of said plurality of passageways, said valving means for selectively routing a filtered water flow from one of said plurality of passageways to said water outlet, said valving means comprising:
 a valve jar;
 a plurality of vents extending through said valve jar, said vents interconnected to said plurality of passageways;
 a valve post positioned in sealed connection with said valve jar, said valve post longitudinally movable within said valve jar, said valve post for selectively interconnecting said water inlet to one of said plurality of vents; and
 actuator means connected to said valve post for enabling actuation of said valve post exterior of said valve jar.

2. The water filter of claim 1, said housing comprising:
 a top cover extending over and connected to said plurality of containers for retaining water therewithin.

3. The water filter of claim 2, said housing further comprising:
 an upper net board interposed between said containers and said top cover, an area between said upper net board and said top cover forming a distribution volume so as to allow water to flow downwardly into said containers.

4. The water filter of claim 3, said housing further comprising:
 a pedestal positioned below said plurality of containers, said pedestal receiving said valving means therewithin, said pedestal supporting said plurality of containers above said valving means.

5. The water filter of claim 3, said top cover comprising an inverted plate-shaped body having a connecting structure along an edge, said upper net board having a hole in a center area thereof.

6. The water filter of claim 1, each of said plurality of containers being of a generally cylindrical configuration, each of said containers having a connecting structure along an end for enabling each of said plurality of containers to be connected in stacked relationship to an adjacent container.

7. The water filter of claim 6, said plurality of containers having a sleeve extending centrally therethrough, said sleeve defining a portion of said plurality of passageways.

8. The water filter of claim 7, further comprising:
 a plurality of net boards interposed between adjacent containers of said plurality of containers.

9. The water filter of claim 7, said sleeve having a vent formed therethrough for allowing water to flow into said container from one of said plurality of passageways.

10. The water filter of claim 1, said valve jar having three vents extending through a top surface so as to connect with said plurality of passageways, said water inlet extending through a side of said valve jar, said water outlet extending through another side of said valve jar.

11. The water filter of claim 1, said valve post having a plurality of parallel seal rings affixed thereon so as to form water passageways between said water inlet, said water outlet, and said plurality of passageways.

12. The water filter of claim 11, said sealing rings comprising S-shaped members.

13. The water filter of claim 1, said actuation means comprising a turning knob connected to said valve post.

* * * * *